United States Patent [19]

Frouin et al.

[11] Patent Number: 5,569,323

[45] Date of Patent: *Oct. 29, 1996

[54] INORGANIC LIQUID FILLER COMPOSITIONS FOR CONSOLIDATION/SEALING OF GROUND FORMATIONS AND BUILDING MATERIALS

[75] Inventors: Laurent Frouin, L'Hay Les Roses; Maryse Pennavaire, Romainville, both of France

[73] Assignee: Rhone-Poulenc Chimie, Courbevoie Cedex, France

[ * ] Notice: The term of this patent shall not extend beyond the expiration date of Pat. No. 5,431,728.

[21] Appl. No.: 247,543

[22] Filed: May 23, 1994

[30] Foreign Application Priority Data

May 21, 1993 [FR] France .................................. 93 06115

[51] Int. Cl.$^6$ .................................................... C04B 12/04
[52] U.S. Cl. ........................ 106/633; 106/600; 106/629; 405/266; 405/267; 166/292
[58] Field of Search ................................... 106/629, 633, 106/600; 166/292; 405/266, 267

[56] References Cited

U.S. PATENT DOCUMENTS

| 3,138,471 | 6/1964 | Wygnnt | 106/629 |
|---|---|---|---|
| 4,056,937 | 11/1977 | Suzuki | 166/292 |
| 4,761,183 | 8/1988 | Clarke . | |
| 5,017,233 | 5/1991 | Gouvenot . | |

FOREIGN PATENT DOCUMENTS

| 2528441 | 12/1983 | France . |
|---|---|---|
| 56-086984 | 7/1981 | Japan . |
| 3-170596 | 7/1991 | Japan . |
| 635064 | 11/1978 | U.S.S.R. . |

OTHER PUBLICATIONS

Derwent Publication 92–397132, "Reducing permeability of earth reservoirs For waste–using alkaline wastes from potassium ore concn. and natural calcium chloride soln.", abstract, Jan. 1992.

Chem Abstracts, JP–4159389, "Grout For Ground", Abstract, Sep. 1992.

Chemical Abstracts, vol. 104, No. 4, 23478s, Jan. 1986, JP–60 124687 (Light Kogyo K.K.) Jul. 1985.

Chemical Abstracts, vol. 98, No. 6, 39779j, Feb. 1983; SU–A–945 130 (Leningrad Technological Institute) Jul. 1982.

Chemical Abstracts, vol. 115, No. 24, 262085v, Dec. 1991; JP 03–170596 (Kyokado Engineering Co.), Jul. 1991.

*Primary Examiner*—Helene Klemanski
*Assistant Examiner*—Michael Marcheschi
*Attorney, Agent, or Firm*—Burns, Doane, Swecker & Mathis, L.L.P.

[57] ABSTRACT

Inorganic liquid filler compositions, well suited for the sealing or consolidation of ground formations or construction/building materials by injecting such composition into the fissures, cavities or interstices thereof (void volume) and permitting the composition to harden, comprise a homogeneous solution of (i) an alkali metal silicate, (ii) an alkali metal polyphosphate and (iii) an alkali metal aluminate.

32 Claims, No Drawings

INORGANIC LIQUID FILLER COMPOSITIONS FOR CONSOLIDATION/SEALING OF GROUND FORMATIONS AND BUILDING MATERIALS

CROSS-REFERENCE TO COMPANION APPLICATION

Our application Ser. No. 08/247,254, now abandoned, filed concurrently herewith and assigned to the assignee hereof.

BACKGROUND OF THE INVENTION

1. Field of the Invention

The present invention relates to substantially or completely inorganic liquid filler compositions and to the consolidation/sealing of ground formations and building materials therewith, in particular via injection technique.

2. Description of the Prior art

The consolidation/sealing of ground formations and building (construction) materials typically entails injecting liquid fillers of various types into the fissures, cavities or interstices thereof, to modify the characteristics of the treated site.

These modifications either improve the mechanical properties of the site in the case of consolidation, or reduce permeability in the case of sealing. The conjoint modification of both properties via injection technique is also possible.

Until recently, ground formation or construction material sealing and consolidation was principally carried out by injecting organic liquid fillers therein. However, products of syneresis of these liquid fillers (decomposition of the chemicals which are injected or formed) can pollute the groundwater table and surface waters.

Preservation of the groundwater table and surface waters such as watercourses and reservoirs is thus a current major concern among those skilled in the art of sealing and/or consolidation of a variety of substrates, particularly via injection technique.

Consequently, a number of inorganic liquid fillers have been tested for such purposes.

Research conducted vis-a-vis the need to satisfy new technological and economic constraints imposed by ecological considerations is widely described in the literature, both patent and otherwise.

For example, FR-A-2,571,734 describes an aqueous injectable liquid filler for ground consolidation and/or sealing which comprises fine particles of amorphous silica and particles of slaked lime.

This liquid filler, however, has a setting time which is too long (about 2 days).

FR-A-2,528,441 describes a ground sealing and/or consolidating agent comprising a specific concentrated soda solution of silica and, optionally, lime or a calcium salt. The dissolved silica reacts with the calcium to form crystals of hydrated calcium silicates.

The problem with the aforesaid liquid fillers, however, is that they either exhibit unsatisfactory final mechanical properties, or a setting time which is too short and incompatible with the desired application, or, again, that the initial viscosity thereof is too high.

SUMMARY OF THE INVENTION

Accordingly, a major object of the present invention is the provision of improved liquid filler compositions, the setting times of which can be controlled.

Another object of the present invention is the provision of improved liquid filler compositions which, after hardening, exhibit satisfactory mechanical properties and nonpolluting characteristics when used for ground or construction/building material sealing and/or consolidating.

Briefly, the present invention features the production of improved liquid filler compositions by contacting an alkali metal silicate solution with an alkali metal polyphosphate solution and with an alkali metal aluminate solution.

DETAILED DESCRIPTION OF BEST MODE AND PREFERRED EMBODIMENTS OF THE INVENTION

More particularly according to the present invention, the subject filler compositions present the advantage of being in the liquid state prior to hardening, permitting use thereof over an especially wide range of ground permeability.

The process of this invention also presents the advantage of being simple and economical to carry out. Further, it presents the added advantage of producing a homogeneous liquid filler in which no settling out is observed.

The liquid filler compositions and preparation thereof in accordance with the invention comprise, as indicated above, a certain number of elements/parameters which will now be more fully described. The description of these elements/parameters is applicable both to the liquid filler compositions and to the preparative technique carried out utilizing same.

The alkali metal present in the compounds employed in the process of the present invention is preferably sodium. By the terms "sodium" or "soda" in the following description, for reasons of clarity and simplicity, are intended the more generic terms "alkali metal" or "alkali metal hydroxide," respectively.

The subject process advantageously uses an alkali metal silicate solution having a $SiO_2/M_2O$ weight ratio greater than or equal to 1.3, preferably greater than or equal to 2; M representing an alkali metal. This ratio is designated $R_i$ in the description to follow.

The alkali metal silicate solution generally has a dry solids content of about 10% to 55%, preferably about 30% to 50%.

For practical reasons, primarily regarding the viscosity of the liquid filler to be prepared, the alkali metal silicate solution is present in proportions sufficient to provide a $SiO_2$ content in the liquid filler preferably less than or equal to 20% by weight, more preferably ranging from about 5% to 15% by weight.

According to the present invention, by the term "alkali metal polyphosphate solution" is intended any solution of a polyphosphate having an average chain length greater than or equal to 3. Exemplary thereof are sodium tripolyphosphate, sodium pentapolyphosphate and sodium hexametaphosphate. These products are well known to this art and are commercially available.

An aqueous sodium polyphosphate solution is typically used. The aqueous solution employed is preferably approaching saturation in polyphosphate. Thus, for example, an aqueous sodium tripolyphosphate solution containing about 8% by weight $P_2O_5$ an aqueous sodium pentapolyphosphate solution containing about 23% by weight $P_2O_5$ and an aqueous sodium hexametaphosphate solution containing about 28% by weight $P_2O_5$ are advantageously employed.

Also for practical reasons, it is preferred to add the silicate and polyphosphate in proportions sufficient to provide a $SiO_2/P_2O_5$ weight ratio greater than or equal to 1.

The alkali metal aluminate solution employed in the process of the present invention is advantageously an aqueous sodium aluminate solution.

Such aqueous sodium aluminate solution may be prepared via any known technique. It may, in particular, be prepared by addition of water to sodium aluminate powder.

Advantageously, soda is added during or following preparation of the aqueous sodium aluminate solution, in particular when carrying out the process of the present invention.

The total amount of alkali metal thus preferably corresponds to the amount required to provide a final $SiO_2/M_2O$ weight ratio of less than 1.5, preferably ranging from about 0.5 to 1.3, and more preferably ranging from about 0.6 to 1.1; M representing the total amount of alkali metal. By "total amount of alkali metal" is intended all forms of alkali metal introduced into the process, more particularly the alkali metal emanating from the alkali metal silicate, aluminate, polyphosphate or hydroxide solutions. This ratio is designated $R_f$ in the description to follow.

In a particular and preferred embodiment of the invention, the subject process is characterized in that the alkali metal silicate and alkali metal polyphosphate solutions are intimately admixed and the alkali metal aluminate solution is then added to the resulting mixture. In this particular and preferred embodiment, the delaying effect on the setting time of the liquid filler, or retardation thereof, is even more pronounced. In accordance with this particular embodiment, when adding soda it is either added simultaneously with or subsequent to addition of the alkali metal aluminate solution.

The alkali metal silicate and alkali metal aluminate solutions are preferably present in proportions sufficient to provide a Al/Si molar ratio in the liquid filler of from 0.01 to 0.5, preferably from 0.05 to 0.4. The liquid filler composition thus obtained sets slowly, without too high a viscosity which would present a problem when used for ground or construction/building material consolidation and/or sealing.

Preferably, an alkali metal polyphosphate solution is used which provides a $P_2O_5$ content ranging from about 0.5% to 5% by weight in the liquid filler, preferably ranging from 0.8% to 4% by weight, for a liquid filler containing at most about 20% by weight of $SiO_2$.

A particularly advantageous liquid filler in accordance with the invention has the following approximate composition:

(a) up to 20% by weight of $SiO_2$;
(b) 0.5% to 5% by weight of $P_2O_5$, the $SiO_2/P_2O_5$ weight ratio being greater than or equal to 1;
(c) an Al/Si molar ratio ranging from 0.01 to 0.5;
(d) a $SiO_2/M_2O$ weight ratio of less than or equal to 1.5; M representing the total alkali metal content.

The liquid fillers of the invention preferably have the following approximate composition:

(a) 5% to 15% by weight of $SiO_2$;
(b) 0.8% to 4% by weight of $P_2O_5$;
(c) an Al/Si molar ratio ranging from 0.05 to 0.4;
(d) a $SiO_2/M_2O$ weight ratio ranging from 0.5 to 1.3, more preferably from 0.6 to 1.1; M representing the total alkali metal content.

In another embodiment of the invention, the subject process employs fine particles of silica such as, in particular, pyrogenic or fumed silica, preferably condensed, or precipitated silica. This embodiment is particularly advantageous when a low initial viscosity liquid filler is required which, nonetheless, exhibits satisfactory mechanical properties after hardening. The maximum amount of fine silica particles to be added may thus be up to a $SiO_2$ content in the liquid filler of 20%, more preferably up to 15% (this amount corresponds to the amount of silica present in the alkali metal silicate solution and that in the fine particles of silica).

When using the process described above for ground or construction/building material sealing and/or consolidating, the compounds are either injected separately into the material to be treated, or preferably are mixed together in advance for subsequent injection, in combination, into such material. The first embodiment presents the drawback of being complicated to carry out, introducing uncertainties into the quality of the treatment (risking heterogenicity in the constituents in the interstices).

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLE 1

The following reagents were mixed in a beaker:

(i) an aqueous sodium silicate solution having a weight ratio $R_i$ ($SiO_2/Na_2O$)=3.3 and dry solids content of 33%,
(ii) an aqueous sodium pentapolyphosphate solution containing approximately 23% by weight $P_2O_5$.

An aqueous soda solution of sodium aluminate prepared from powdered sodium aluminate marketed by CARIO, ERBA® (56% $Al_2O_3$; 37% $Na_2O$) was then added.

The products were mixed in proportions sufficient to provide a liquid filler having a $SiO_2$ content of 10%, a Al/Si molar ratio of 0.28, a $P_2O_5$ content of 0.93% and a $R_f$ ratio of 1.02, the water content being 77%.

The setting time, corresponding to the time required for the liquid filler to cease flowing along the beaker wall, when inverted, was 4 minutes.

EXAMPLE 2

The procedure of Example 1 was repeated, except that the Al/Si molar ratio was 0.19 and the $R_f$ was 0.67.

The setting time, again corresponding to the time required for the liquid filler to cease flowing along the beaker wall, when inverted, was 20 hours.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A liquid filler composition of matter, having an Al/Si molar ratio ranging from 0.01–0.5 comprising homogeneous solution of (i) an alkali metal silicate, (ii) an alkali metal polyphosphate and (iii) an alkali metal aluminate.

2. The liquid filler composition as defined by claim 1, said alkali metals being sodium.

3. The liquid filler composition as defined by claim 1, said alkali metal silicate having a $SiO_2/M_2O$ ratio by weight of at least 1.3, wherein M is the alkali metal.

4. The liquid filler composition as defined by claim 3, said ratio being at least 2.

5. The liquid filler composition as defined by claim 1, comprising 20% or less by weight of $SiO_2$ provided by the alkali metal silicate.

6. The liquid filler composition as defined by claim 5, comprising from about 5% to 15% by weight of $SiO_2$ provided by the alkali metal silicate.

7. The liquid filler composition as defined by claim 1, said alkali metal polyphosphate comprising an alkali metal tripolyphosphate, pentapolyphosphate or hexametaphosphate.

8. The liquid filler composition as defined by claim 1, comprising a homogeneous aqueous solution.

9. The liquid filler composition as defined by claim 1, wherein the silicate and polyphosphate are present in an amount to provide a $SiO_2/P_2O_5$ ratio by weight of at least 1.

10. The liquid filler composition as defined by claim 1, further comprising an alkali metal hydroxide.

11. The liquid filler composition as defined by claim 10, said alkali metal hydroxide comprising sodium hydroxide.

12. The liquid filler composition as defined by claim 1, wherein the silicate and alkali metal are present in an amount to provide a $SiO_2/M_2O$ ratio by weight of less than 1.5, wherein M is the alkali metal.

13. The liquid filler composition as defined by claim 12, said $SiO_2/M_2O$ ratio ranging from 0.5 to 1.3.

14. The liquid filler composition as defined by claim 1, said Al/Si molar ratio ranging from 0.05 to 0.4.

15. The liquid filler composition as defined by claim 1, comprising from about 1% to 5% by weight of $P_2O_5$ provided by the alkali metal polyphosphate and 20% or less by weight of $SiO_2$ provided by the alkali metal silicate.

16. The liquid filler composition as defined by claim 1, further comprising fine particles of silica.

17. The liquid filler composition as defined by claim 8, comprising (a) 20% or less by weight of $SiO_2$ provided by the alkali metal silicate, (b) from 0.5% to 5% by weight of $P_2O_5$ provided by the alkali metal polyphosphate and a $SiO_2/P_2O_5$ ratio by weight of at least 1, and (c) a $SiO_2/M_2O$ ratio by weight of up to 1.5, wherein M represents the total amount of alkali metal.

18. The liquid filler composition as defined by claim 17, comprising (a) from 5% to 15% by weight of SiO2 provided by the alkali metal silicate, (b) from 0.8% to 4% by weight of $P_2O_5$ provided by the alkali metal polyphosphate and a $SiO_2/P_2O_5$ ratio by weight of at least 1, (c) an Al/Si molar ratio ranging from 0.05 to 0.4, and (d) a $SiO_2/M_2O$ ratio by weight ranging from 0.5 to 1.3, wherein M represents the total amount of alkali metal.

19. The liquid filler composition as defined by claim 18, said $SiO_2/M_2O$ ratio by weight (d) ranging from 0.6 to 1.1.

20. A process for the formulation of the liquid filler composition as defined by claim 1, comprising intimately admixing a solution of an alkali metal silicate with a solution of an alkali metal polyphosphate and with a solution of an alkali metal aluminate.

21. The process as defined by claim 20, wherein the alkali metal silicate has a $SiO_2/M_2O$ ratio by weight of at least 1.3, wherein M is the alkali metal.

22. The process as defined by claim 21, said ratio being at least 2.

23. The process as defined by claim 8, wherein the alkali metal silicate solution has dry solids content ranging from about 10% to 55%.

24. The process as defined by claim 23, said dry solids content ranging from about 30% to 50%.

25. The process as defined by claim 20, said solution of an alkali metal polyphosphate comprising an essentially saturated aqueous solution.

26. The process as defined by claim 20, said solution of an alkali metal aluminate comprising an aqueous solution.

27. The process as defined by claim 20, comprising intimately admixing said solution of an alkali metal silicate with said solution of an alkali metal polyphosphate and then adding thereto said solution of an alkali metal aluminate.

28. A process for sealing or consolidation of a ground formation or construction/building material, comprising injecting therein an effective sealing/consolidating amount of the liquid filler composition as defined by claim 1, and permitting said composition to harden.

29. The process as defined by claim 28, comprising separately injecting at least one solution of at least one of the alkali metal silicate the alkali metal polyphosphate and the alkali metal aluminate, of said liquid filler composition into said ground formation or construction/building material.

30. The process as defined by claim 28, comprising injecting a mixture of all constituents of the liquid filler composition into said ground formation or construction/building material.

31. A composition of matter having an Al/Si molar ratio ranging from 0.01–0.5 comprising an alkali metal silicate, an alkali metal polyphosphate and an alkali metal aluminate.

32. The composition of matter as defined by claim 31, having respective proportions of the alkali metal silicate the alkali metal polyphosphate and the alkali metal aluminate, such that an aqueous solution of the same is autogenously hardenable.

* * * * *